US011140132B1

(12) United States Patent
Samaha

(10) Patent No.: US 11,140,132 B1
(45) Date of Patent: Oct. 5, 2021

(54) NETWORK FLOW MANAGEMENT

(71) Applicant: Amazon Technologies, Inc., Seattle, WA (US)

(72) Inventor: Camil Farah Samaha, Sterling, VA (US)

(73) Assignee: Amazon Technologies, Inc., Seattle, WA (US)

( * ) Notice: Subject to any disclaimer, the term of this patent is extended or adjusted under 35 U.S.C. 154(b) by 117 days.

(21) Appl. No.: 16/709,827

(22) Filed: Dec. 10, 2019

(51) Int. Cl.
*G06F 15/16* (2006.01)
*H04L 29/06* (2006.01)
*H04L 12/46* (2006.01)
*H04L 12/24* (2006.01)
*G06F 9/455* (2018.01)

(52) U.S. Cl.
CPC ...... *H04L 63/0272* (2013.01); *H04L 12/4633* (2013.01); *H04L 41/0806* (2013.01); *H04L 63/0227* (2013.01); *H04L 63/20* (2013.01); *G06F 2009/45595* (2013.01)

(58) Field of Classification Search
CPC ............ H04L 63/0272; H04L 12/4633; H04L 41/0806; H04L 63/0227; H04L 63/20; G06F 2009/45595
USPC ............................................ 709/200; 726/15
See application file for complete search history.

(56) References Cited

U.S. PATENT DOCUMENTS

| | | | | |
|---|---|---|---|---|
| 7,486,659 B1* | 2/2009 | Unbehagen | ......... | H04L 12/4633 370/351 |
| 8,316,435 B1* | 11/2012 | Varadhan | ............ | H04L 63/0254 726/15 |
| 2003/0131263 A1* | 7/2003 | Keane | .................... | H04L 63/101 726/15 |
| 2004/0214622 A1* | 10/2004 | Atkinson | ............... | H04L 63/168 463/1 |
| 2006/0094400 A1* | 5/2006 | Beachem | .............. | H04M 7/121 455/410 |
| 2009/0016361 A1* | 1/2009 | Serbest | ............... | H04L 12/4633 370/399 |
| 2010/0043068 A1* | 2/2010 | Varadhan | ................ | H04L 45/60 726/15 |
| 2010/0254385 A1* | 10/2010 | Sharma | ............... | H04L 12/4633 370/392 |
| 2012/0227102 A1* | 9/2012 | Parla | .................... | H04W 12/069 726/15 |
| 2013/0298182 A1* | 11/2013 | May | .................... | H04L 63/0485 726/1 |
| 2015/0195105 A1* | 7/2015 | Zhuang | ............... | H04L 12/4683 370/254 |

(Continued)

*Primary Examiner* — Anthony Mejia
(74) *Attorney, Agent, or Firm* — Davis Wright Tremaine LLP

(57) ABSTRACT

Computing resource service providers provide computing resources to customers in a multi-tenant environment. Communication between resources in a customer's virtual private network and an internet gateway in the form of data packets may be intercepted and processed by a firewall to help ensure that traffic entering or exiting the customer's virtual private network is valid and secure. These data packets are intercepted and analyzed by a service in a separate virtual private network and filtered in a way such that data packets with the same networking flow are provided to the same firewall servers so that firewall rules applied to the data packets are consistent.

20 Claims, 9 Drawing Sheets

(56) References Cited

U.S. PATENT DOCUMENTS

| | | | |
|---|---|---|---|
| 2016/0087876 A1* | 3/2016 | Fan | H04L 45/14 709/242 |
| 2016/0119281 A1* | 4/2016 | Tanaka | H04L 47/825 370/392 |
| 2017/0171158 A1* | 6/2017 | Hoy | H04L 63/164 |
| 2017/0237650 A1* | 8/2017 | Beeram | H04L 49/70 370/390 |
| 2018/0219769 A1* | 8/2018 | Uttaro | H04L 45/38 |
| 2018/0241823 A1* | 8/2018 | Dawani | H04L 63/0272 |

* cited by examiner

NETWORK FLOW MANAGEMENT

BACKGROUND

In a large distributed computing system of a computing resource service provider, various customers, users, services, and resources of the computing resource service provider are in frequent communication with each other. Ensuring that the system is secure while the frequent communication occurs becomes more challenging as the complexity and usage of the system increases. In such distributed computing systems, significant resources are involved to identify and eliminate vulnerabilities of the system. Furthermore, it can also be difficult to isolate and troubleshoot issues with the system, and even when issues are identified, reliably securing the system may be challenging. Additionally, many conventional systems rely upon manual mitigation of such vulnerabilities. The complexity and distribution of computing resources in these environments may make it difficult to consistently apply firewall rules to all of the communication flowing into and out of the computer resource service provider.

BRIEF DESCRIPTION OF THE DRAWINGS

Various techniques will be described with reference to the drawings, in which.

DETAILED DESCRIPTION

Figure 1:
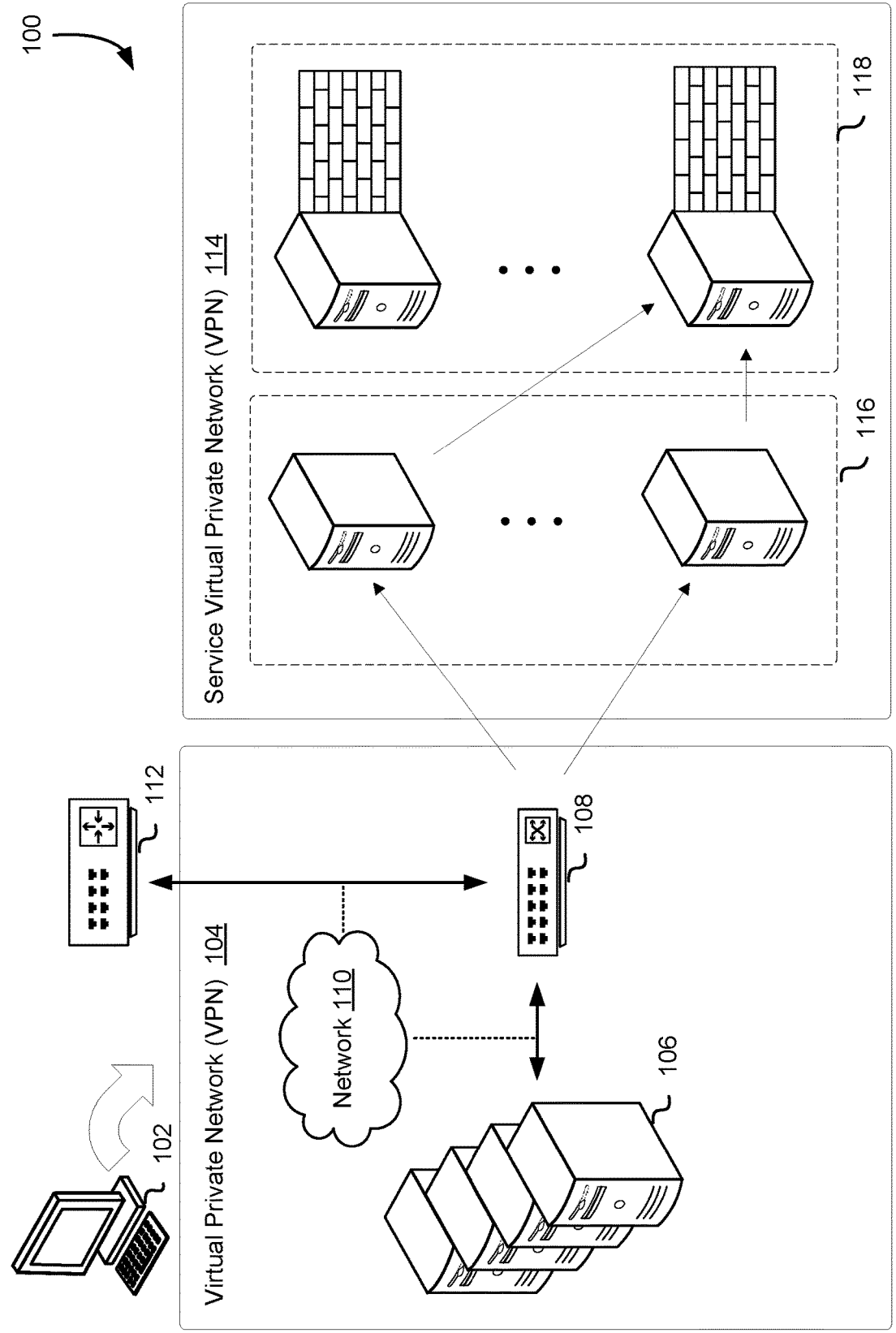
FIG. 1 illustrates an environment in which a customer's virtual private network uses a service virtual private network to forward data packets to firewall servers in accordance with an embodiment.

Techniques described and suggested herein relate to a managed network layer security service that provides customers with fine-grained controls for blocking, filtering, rate limiting, recording, and otherwise securing network traffic to, from, and between their virtual private networks (VPNs). This managed network layer security service is an inline security solution that is capable of analyzing stateless and stateful traffic flows and it does so in a bump-in-the-wire configuration by analyzing the traffic and then putting it back on the network without terminating connections. When using this service, customers may enable managed and curated rules with a single click or create customized, application-specific network traffic filter rules. This is a managed service where, when VPN traffic increases the always-on protections scale automatically without any significant impact to application availability or performance. This service also provides a scalable flow balancing tier such that networking flow (e.g., data packets) with the same packet metadata information are being routed to the same firewall servers. In other words, this service provides a flow balancing tier to distribute flows uniformly over the firewall servers such that incoming data packets belonging to the same flow will be consistently mapped to the same firewall destination.

In a customer's VPN, computing resources such as virtual machine instances may establish communication over a network with a web server via an internet gateway. In an embodiment, the computing resources may send and receive data packets with the web server via the internet gateway. These data packets contain packet metadata information such as source and destination Internet Protocol (IP) addresses, protocols, and/or port information. The customer or an authorized user may configure the customer's VPN to include firewall devices (e.g., network security devices) that monitors the incoming and outgoing network traffic to permit or block data packets based on a set of security rules. In an effort to ensure that all network traffic with the same information are being routed to the correct firewall server so that firewall rules may be applied to the data packets, and these data packets may be intercepted at a service endpoint associated with the customer's VPN. This service endpoint may be configured to intercept all outgoing and incoming network traffic in connection with the computing resources in the customer's VPN. The service endpoint may communicate with a service VPN, which may be configured by the customer, to provide load balancing and to further ensure that data packets with the same packet metadata information that are flowing into and out of the customer's VPN are being analyzed by the same firewall server(s). In other words, the service VPN may be an additional service that is accessible to the customer to ensure that the same flow in a network flow always gets routed to the correct or same firewall server.

The service VPN may be configured with a first service layer that includes a set of servers that are flow directors (e.g., servers that direct network traffic flow) and a second service layer that includes a set of servers that apply firewall rules (e.g., firewall servers). That is, in an embodiment, once a data packet has been intercepted by a service endpoint from a customer's VPN, it will be forwarded to the service VPN for analysis and/or filtering. The service VPN will determine, based at least in part on the filtering and information in the packet metadata, which one of the servers in the first layer is used to provide consistent hashing such that the data packets with the same flow are mapped to the same firewall server in the second service layer. Since the possibility exists that data packets belonging to the same flow will not end up on the same firewall server, the first service layer with a set of servers are used to provide consistent hashing to ensure that a particular flow is directed to the same firewall server. Each of the servers in the first service layer will have a forwarding table (e.g., mapping table) which can be generated identically and independently on each server. This forwarding table will provide information so that flows are distributed uniformly over to the firewall servers and incoming data packets belonging to the same flow will be consistently mapped to the same row of the forwarding table. Each row will contain the Internet Protocol (IP) address of the primary firewall server. A secondary server address is also added to help with forwarding traffic flows received at the first service layer. In an embodiment, in an effort to achieve the desired uniform distribution of flows to the firewall servers, each server will appear equally in the primary and secondary fields of the forwarding table.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment 100 in which a customer 102 may configure a VPN 104 that includes a set of computing resources 106 hosted by computing resource service provider (not depicted in FIG. 1), where computing resources 106 may provide the customer 102 with services such as data storage, data processing, communications with web servers, etc. As depicted in FIG. 1, the customer 102 may be a user that uses a computing device to send instructions to the computing resource provider to associate or assign a set of computing resources 106 to the customer 102 for utilization. The customer 102 may configure the amount computing resources it needs. In an embodiment, the set of computing resources 106 are virtual machines instances. FIG. 1 depicts multiple computing resources 106; however, in some embodiments, the customer may configure just a single computing resource. When directed by the customer 102, the set of computing resources 106 may communicate with a web server (not depicted in FIG. 1) via an internet gateway 112 (e.g., router) over a network 110. In some embodiments, the customer's VPN 104 may be also referred to as a customer's virtual private cloud (VPC). In an embodiment, a customer's VPC allows the customer to launch resources into a virtual network that the customer has defined by submitting web service API calls to a control plane of the system from the customer (or possibly from a server with instructions from the customer). A customer's VPC is a virtual network that closely resembles a traditional network that the customer operates in their own data center, with the benefits of being able efficiently scale the network up or down when necessary. In an embodiment, the customer configures the amount of computing resource 106 it needs to form the customer's VPC. In an embodiment, a customer's VPC includes a subset of the resources that are grouped together to form a subnet. This subnet may include a range of IP addresses in the customer's VPC. Moreover, in an embodiment, a customer's VPC includes a route table that contains a set of rules, called routes, that are used to determine where network traffic is directed. The customer's VPC may also include an internet gateway 112 is a horizontally scaled, redundant, and highly available VPC component that allows communication between instances in the customer's VPC and the internet. As mentioned above the customer's VPC may also include service endpoint 108, which enables the customer 102 to privately connect the VPC to services.

While the set of computing resources 106 are in communication with internet gateway 112 to communicate with a web server, the set of computing resources 106 may send/receive information such as data packets using network 110. These data packets may comprise at least source and destination Internet Protocol (IP) addresses, protocols, and/or port information. These data packets may be intercepted by a service endpoint 108 inside of the customer's VPN 102. The service endpoint 108, which may be a computing device or a computing instance, may then forward or send the intercepted data packets with a service VPN 114 such that firewall rules, using firewall servers, may be applied to the data packets. The service VPN 114 may comprise of a plurality of servers that are split between at least two layers of service. In an embodiment, the service VPN 114 includes a first service layer 116 with a first set of servers that are used to help direct flow of the data packets (e.g., flow director servers). Moreover, the service VPN 114 includes a second service layer 118 with a second set of servers that are used to apply firewall rules (e.g., firewall servers). In an embodiment, the firewall rules are configured by the customer 102 and the firewall servers generate logs, alerts, and take actions such as drop/reject/rate-limit on traffic based on various characteristics defined in the rules. That is, in an embodiment, customer 102 uses a firewall managing service to enable security rules and security groups for a customer's VPN and its associated resources. The customer 102 may submit API calls to the firewall managing service to group rules, build policies, and centrally apply security policies across their entire infrastructure. In an embodiment, both of these service layers are scalable (e.g., servers in each of these layers can be added/removed). That is, in an embodiment, the first service layer 116 may be automatically scaled in and out to meet customer traffic requirements. Scaling events, such as additions and planned/unplanned removes, would have minimal impact on existing flows.

Since not all data packets belonging to the same flow end up with the same firewall server, the service VPN 114 may obtain an intercepted data packet (a data packet that was intercepted while traveling along a network path in the customer's VPN 104) to analyze its contents (e.g., packet metadata). After this analysis, the service VPN 114 may then determine which one of the servers from its first service layer 116 can be used to provide consistent hashing on the data packet. Traffic connections are flow hashed across valid targets in a set of servers of the first service layer 116 and change events (e.g. health, membership, weight) can result in traffic flow rehashing, potentially disrupting all current flows.

In an embodiment, each of the servers in the first service layer 116 are associated with a forwarding table (e.g., mapping table) which can be generated identically and independently on each server. This forwarding table will provide information so that flows may be distributed uniform to the firewall servers in the second service layer 118 and incoming data packets belonging to the same flow will be consistently mapped to the same row of the forwarding table. Incoming packets are consistently hashed to the forwarding table rows, with each row containing a primary and secondary server pair.

In an embodiment, a hash function such as a Rendezvous or highest random weight (HRM) is applied to the data packet. In other embodiments, SipHash pseudo-random hash function is used. As an example, Rendezvous hashing has the desired properties to satisfy the stated requirements:

1. Efficient;
2. Loads are distributed uniformly across sites;
3. Minimal disruption when a site fails; only the objects mapped to that side need to be remapped; and
4. Distributed agreement can be reached on k sites by selecting the top k sites in the ordering.

In an embodiment, the Rendezvous algorithm is used to result in a sorted list of servers for each row in the forwarding table, with a server only appearing once in each list. The first two entries in the list are used as the primary and secondary respectively. Thus, flows may normally be forwarded to the primary server and the secondary may be used in case of change events to try to maintain traffic flows to the correct firewall server.

In an embodiment, after firewall rules have been applied using one of the firewall servers in the second service layer 118, the data packets are reinserted back into the network flow without having any of the connections terminated. In an embodiment, since the first service layer 116 does not track state, return traffic does not need to flow back through it as it saves instance bandwidth and therefore reduces the number of required instances (e.g., infrastructure cost) at the first service layer 116. The data packet is returned back to the network from the second service layer 118 without passing through the first service layer 116 again.

Figure 2:
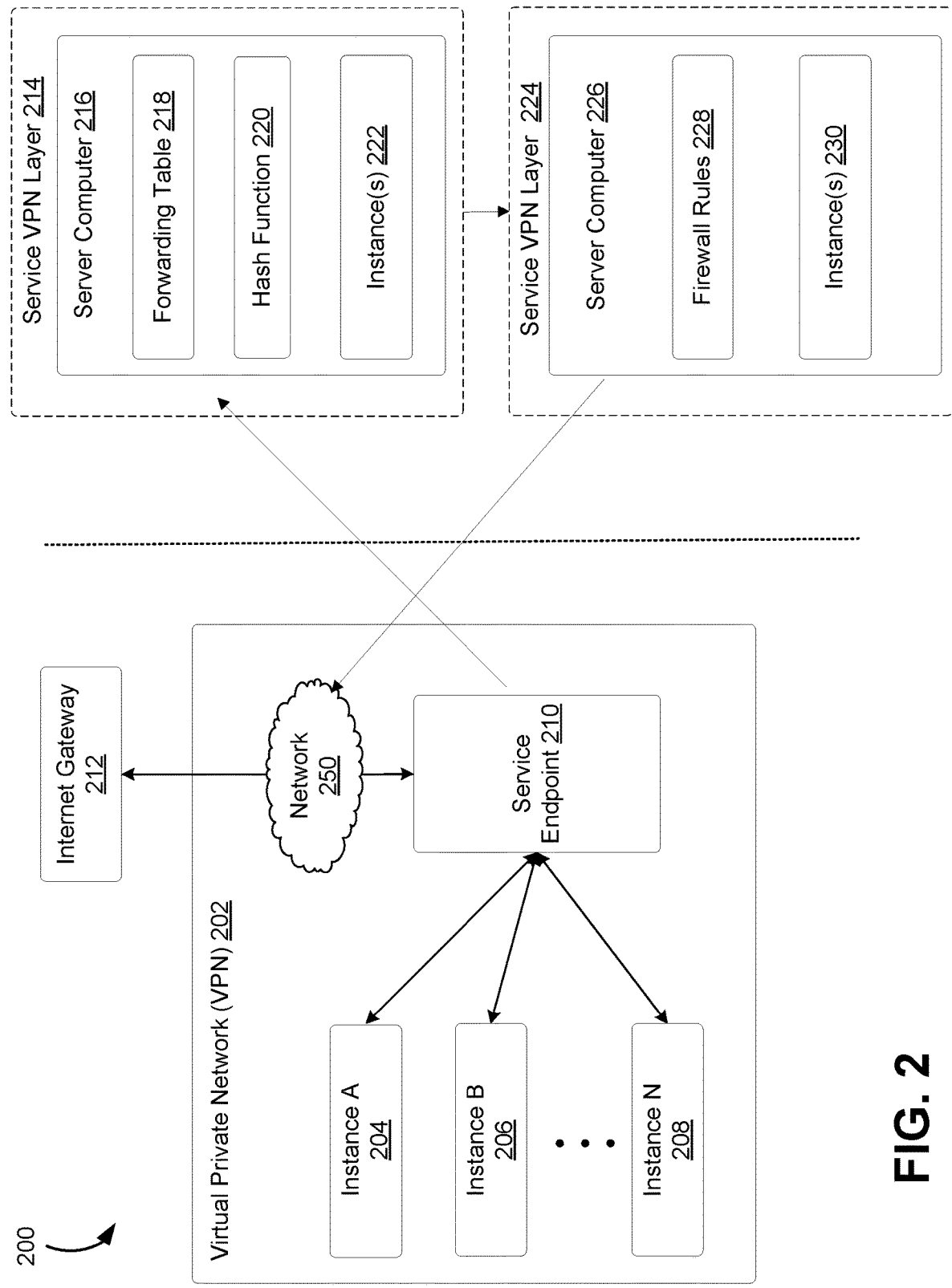
FIG. 2 shows a simplified block diagram of a virtual private network that uses a service endpoint to forward data packets to a service virtual private network comprising multiple layers in accordance with an embodiment.

FIG. 2 is an illustration of a simplified block diagram 200 of a VPN 202 that uses a service endpoint 210 to forward data packets to a service VPN comprising multiple layers in accordance with an embodiment. The VPN 202 may be configured by a customer (not depicted in FIG. 2, but depicted in FIG. 1) such that a set of computing resources (e.g., compute instances) are grouped together for the customer's use. These compute instances 204, 206, 208 may be hosted by a computing resource service provider (not depicted in FIG. 2) and associated with the customer's account so that when requested, the user may provision these instances for use. FIG. 2 only depicts three compute instances; however, in some embodiments, there may be more than three compute instances that the customer uses in its VPN 202. The VPN 202 may also be referred to as the customer's VPN or a customer's virtual private cloud (VPC). In the customer's VPN 202, compute instances 204, 206, 208 may communicate over network 250 with an internet gateway 212. In some embodiments, the internet gateway 212 is a router or, in other embodiments, a web server. Moreover, in some embodiments, the internet gateway 212 may be executed inside of the customer's VPN 202 instead of outside of it.

As network traffic flows through network 250, a service endpoint 210 may be configured to execute inside of the customer's VPN 202 to intercept data packets. The service endpoint 210 may provide the intercepted data packet to a service VPN. As shown in FIG. 2, the service VPN may be a separate VPN from the customer's VPN 202. However, in some embodiments, the service VPN may be executed inside of the customer's VPN 202. In some embodiments, the service endpoint 210 may aggregate data packets and send them to the service VPN as a batch of data packets instead of sending them one at a time. In an embodiment, once the service VPN has obtained the intercepted packet, a server computer 216 with a plurality of compute instances 222 associated with a first service layer in a service VPN 214 is determined. The server computer 216 selected from service VPN layer 214 may be determined based at least in part on packet metadata from the data packet, and may be the one that provides not only consistent hashing (using a hash function 220) to the data packet, but also configured to load balance traffic flow. In an embodiment, the hash function may be a Rendezvous hash algorithm that, when applied, to the data packet results in a mapping that ensures a particular flow is directed to the same server from the service VPN layer 224. The results from the hash function 220 will be added to forwarding table 218 that is specifically associated with server computer 216.

Thereafter, server computer 216 may determine, based at least in part on the forwarding table 218, a destination IP address of a server computer 226 with a plurality of compute instances 230 in service VPN layer 224. Sever computer 226 may also be referred to as a firewall server where firewall rules 228 may be applied to the data packet. As an example, firewall rules may contain a set of rules that allow or disallow data packets to continue on in transmission over the network 250. In another example, firewall rules may contain a set of rules to rate limit the data packet. In some embodiments, the server computer 226 uses at least one of the plurality of instances 230 to perform operations related to the firewall rules 228. In an embodiment, the firewall server includes a threat detection engine that is capable of providing real-time intrusion detection (IDS), inline intrusion prevention (IPS), network security monitoring (NSM), and offline pcap (an API for capturing network traffic) processing. This threat detection engine may also track, reassemble, and analyze Transmission Control Protocol (TCP) connections. Moreover, the firewall server may also include a system that mitigates large volume attacks (usable to determine whether data packets are allowed or need to be rejected). Although FIG. 2 depicts that there is just one server computer 216 in service VPN layer 214 and one server computer 226 in service VPN layer 224, there may, in some embodiments, be additional server computers in each of those layers.

Figure 3:
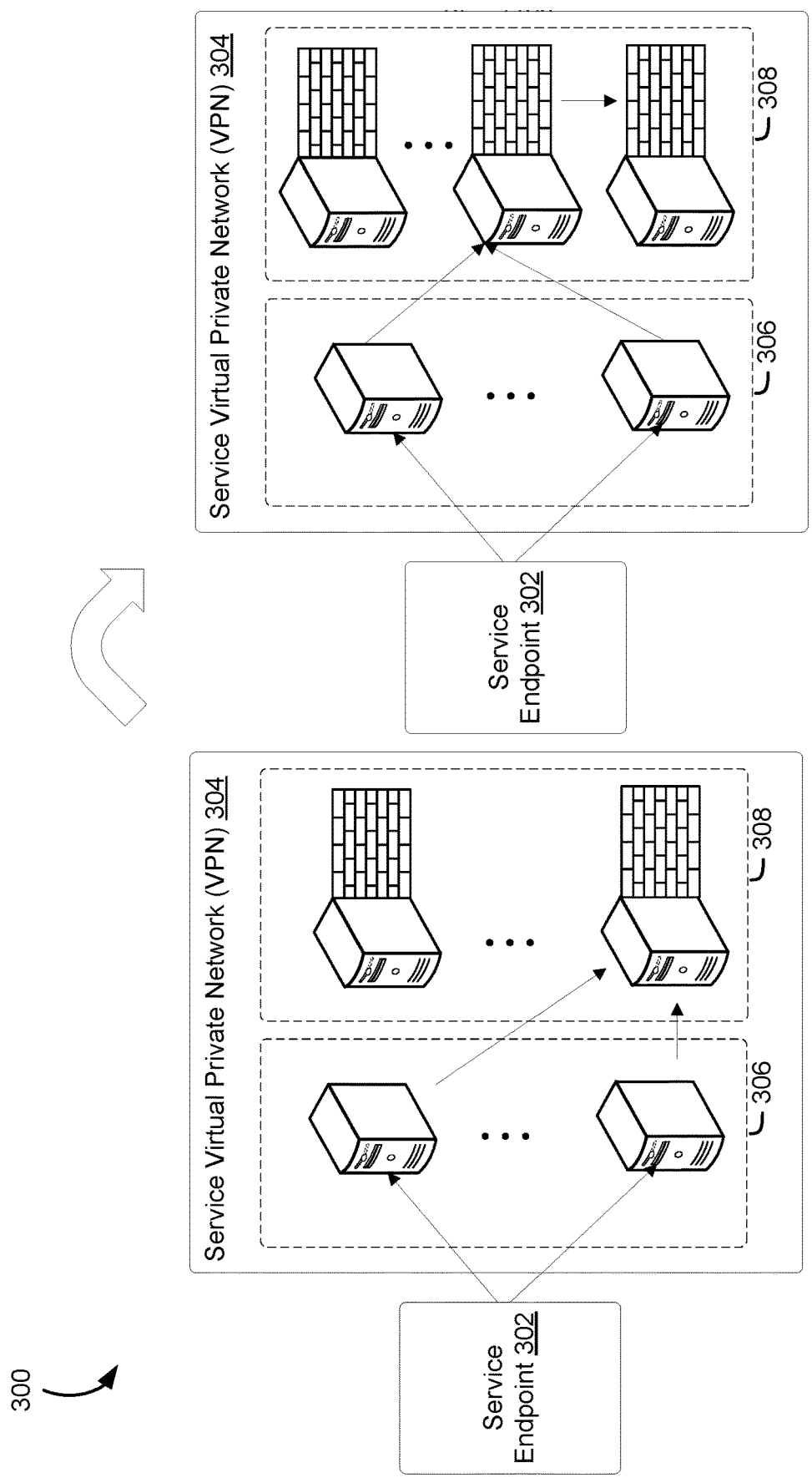
FIG. 3 illustrates an environment of changes to firewall servers in a service virtual private network in accordance with an embodiment.

FIG. 3 illustrates an example environment 300 of changes to firewall servers 308 in a service VPN 304 in accordance with an embodiment. For example, if a firewall server is added, the forwarding table, associated with a particular server in a first service layer 306, is updated so that for 1/N flows the new server becomes the primary, and the old primary becomes the secondary. In an embodiment, the impacted traffic flows would then be sent to the new server, which would determine whether to process the data packets (that were intercepted by service endpoint 302) locally or to forward them to the secondary server (e.g., the old primary with the flow state). This behavior would persist for a limited amount of time (e.g., 2 seconds) while the new entry is in the filling state. Once the state changes to active, all flows may then be processed locally on the firewall servers 308.

When changes (e.g., adding a firewall server) are made in the service layer with the firewall servers 308, the forwarding table associated with the server in the first service layer 306 needs to be recalculated to handle change events at the service layer with the firewall servers. Changes that may happen with the firewall server may include adding and removing firewall instances, as well as unplanned instance failures. For planned events, a service control plane will notify the servers in the first service layer 306 as part of the change management workflow. Each server of the first service layer 306 may then recalculate (e.g., update) its forwarding table based on the modified list of available firewall servers. To handle firewall server failures, each server of the first service layer 306 may run its own health check process to continually monitor the availability of the backend servers. That is, in an embodiment, when a firewall server failure is detected (within a certain amount of seconds), the server is removed from the list and the forwarding table is recalculated (e.g., updated). This would impact 1/N of existing flows, where N is equal to the number of firewall servers. In an embodiment, impact does not necessarily mean terminating a flow and dropping packets, but rather losing flow state.

Figure 4:
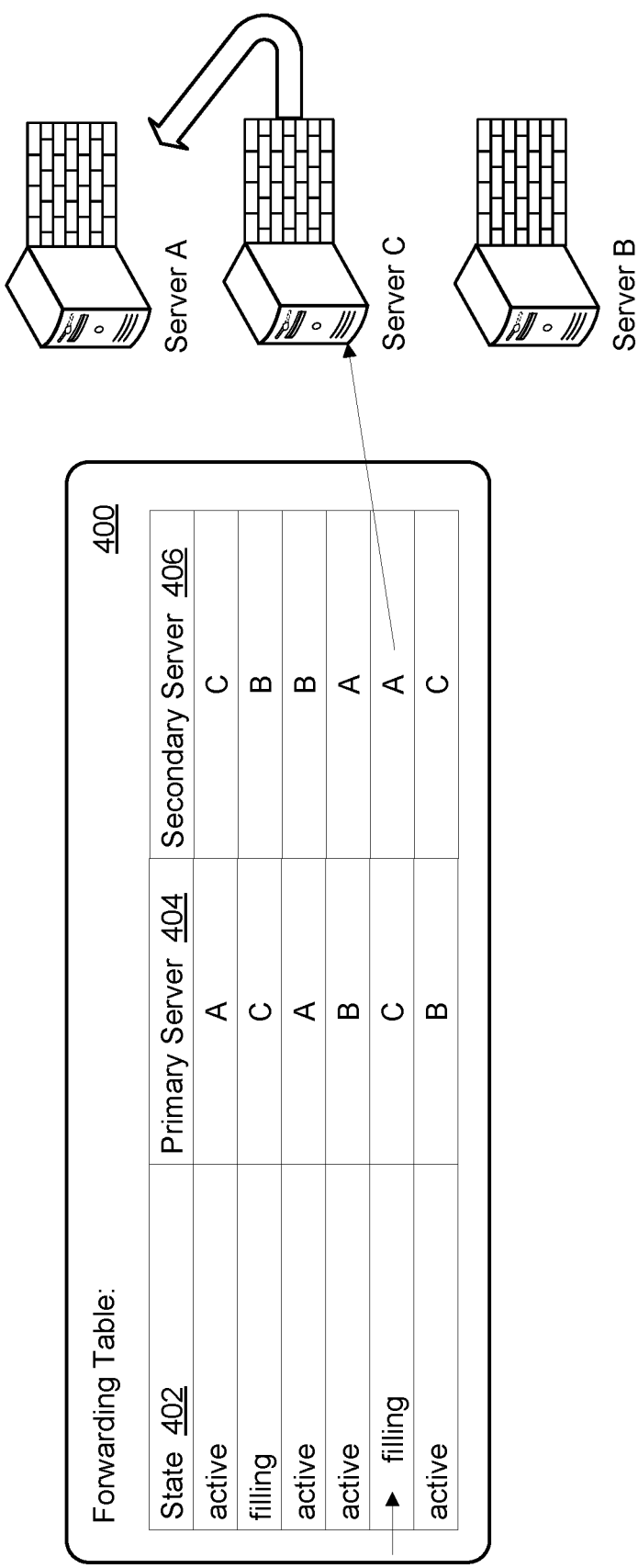
FIG. 4 illustrates a forwarding table associated with a server in a service virtual private network when a firewall server is added in accordance with an embodiment.

FIG. 4 illustrates an example forwarding table 400 associated with a server in a service VPN when a firewall server is added in accordance with an embodiment. When a new firewall server (depicted in FIG. 4 as "Server C") is added to the list of available servers, the forwarding table is reshuffled so that 1/N rows have the new server address as the primary server. The state is changed to filling and the old primary server becomes the secondary server. When a primary server is not in the active state, the secondary server address is added to the encapsulated data for all data packets belonging to flows pointing to the primary server (1/N rows). The receiving firewall server would then determine whether to process the data packets locally or to forward them to the secondary server. After a predetermined amount of seconds, the state is updated to active and the secondary address is no longer in the encapsulated data. In some embodiments, the amount of time that elapses may be exactly 2 seconds or it may be less or more than 2 seconds.

Figure 5:
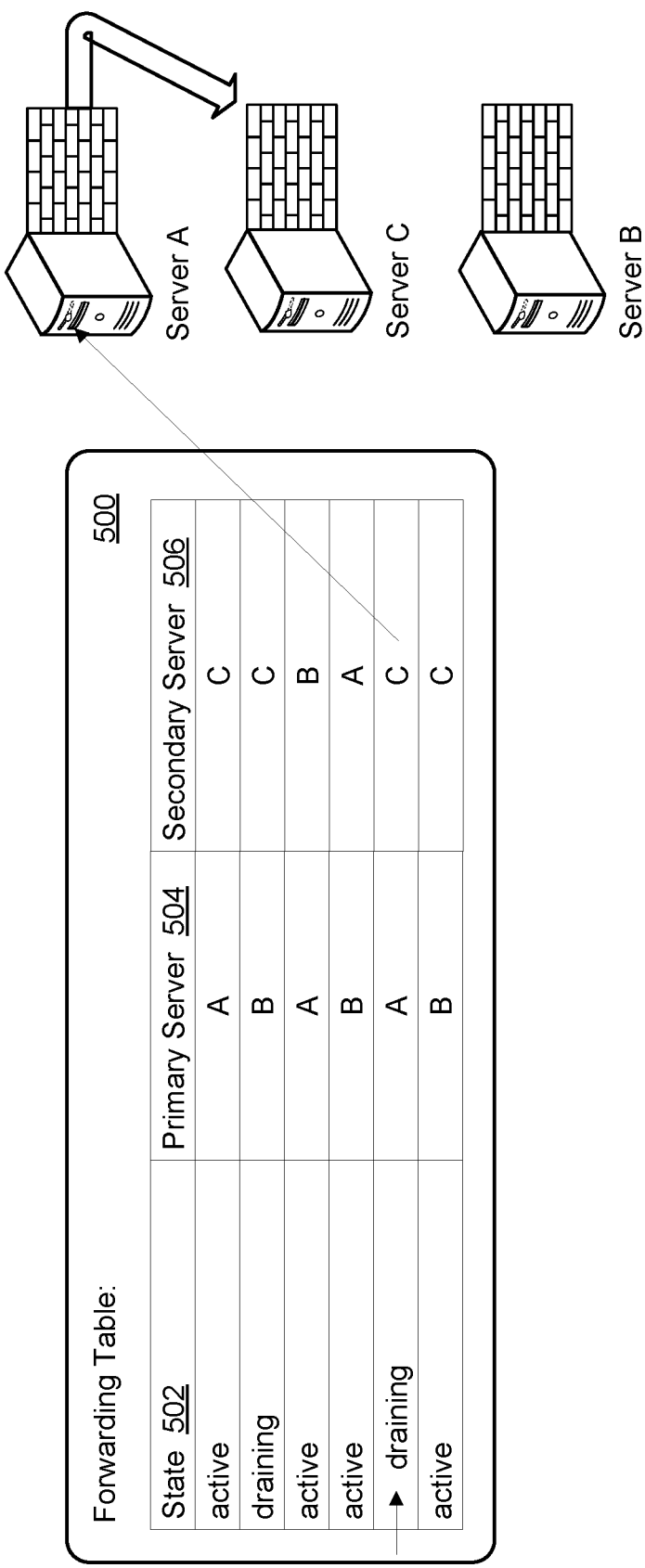
FIG. 5 illustrates a forwarding table associated with a server in a service virtual private network when a firewall server is removed in accordance with an embodiment.

FIG. 5 illustrates an example forwarding table 500 associated with a server in a service VPN when a firewall server is removed in accordance with an embodiment. In an embodiment, when a firewall server is removed due to a planned event, the impacted rows (1/N) of the forwarding tables are updated to swap the primary and secondary entries and the state is set to draining for a predetermined amount of seconds (e.g., 2 seconds). While in the draining state the secondary (old primary) address is included in the encapsulated data. After a predetermined amount of seconds, the server is removed from the list and the forwarding table is reshuffled to fill in the empty secondary entries. The state is also updated to active.

In an embodiment, the server in a first service layer 306 as depicted in FIG. 3 processes a single drain event at a time. In other words, only a single firewall server can be in a draining state in the forwarding table (depicted in FIG. 5 as "Server C"). In the unlikely scenario where multiple events occur simultaneously, or within a time period where another server is still in a draining state, then these changes may be handled sequentially.

Moreover, a firewall server of the list of firewall servers may experience a failure. When a server failure is detected, the failed server is immediately removed from the forwarding table. In other words, a server may go in the draining state only after a planned event (e.g., auto-scaling). A planned firewall removal logic may be implemented to avoid having more than one server draining. In an embodiment, the health check process may be used by a server of the first service layer 306 as depicted in FIG. 3. The health check process may detect an unplanned firewall server failure and it may immediately remove the server from the list and re-calculates the forwarding table. For 1/N of existing flows, where N is equal to the number of firewall servers, flow state is lost and data packets are forwarded to a new primary firewall which processes them locally.

In another embodiment, a way to deal with detected failures is to swap the primary and secondary entries, which is similar to a planned draining event. By doing it this way, it may address the possibility of having false-positives and would give the stateful flows a chance to land on the correct firewall server. However, this may lead to some drawbacks as it could potentially lead to dropped packets if the server were indeed not available. In an embodiment, a way to avoid dropping packets may be for the primary firewall server to check the health of the secondary server before it forwards it any traffic.

Figure 6:
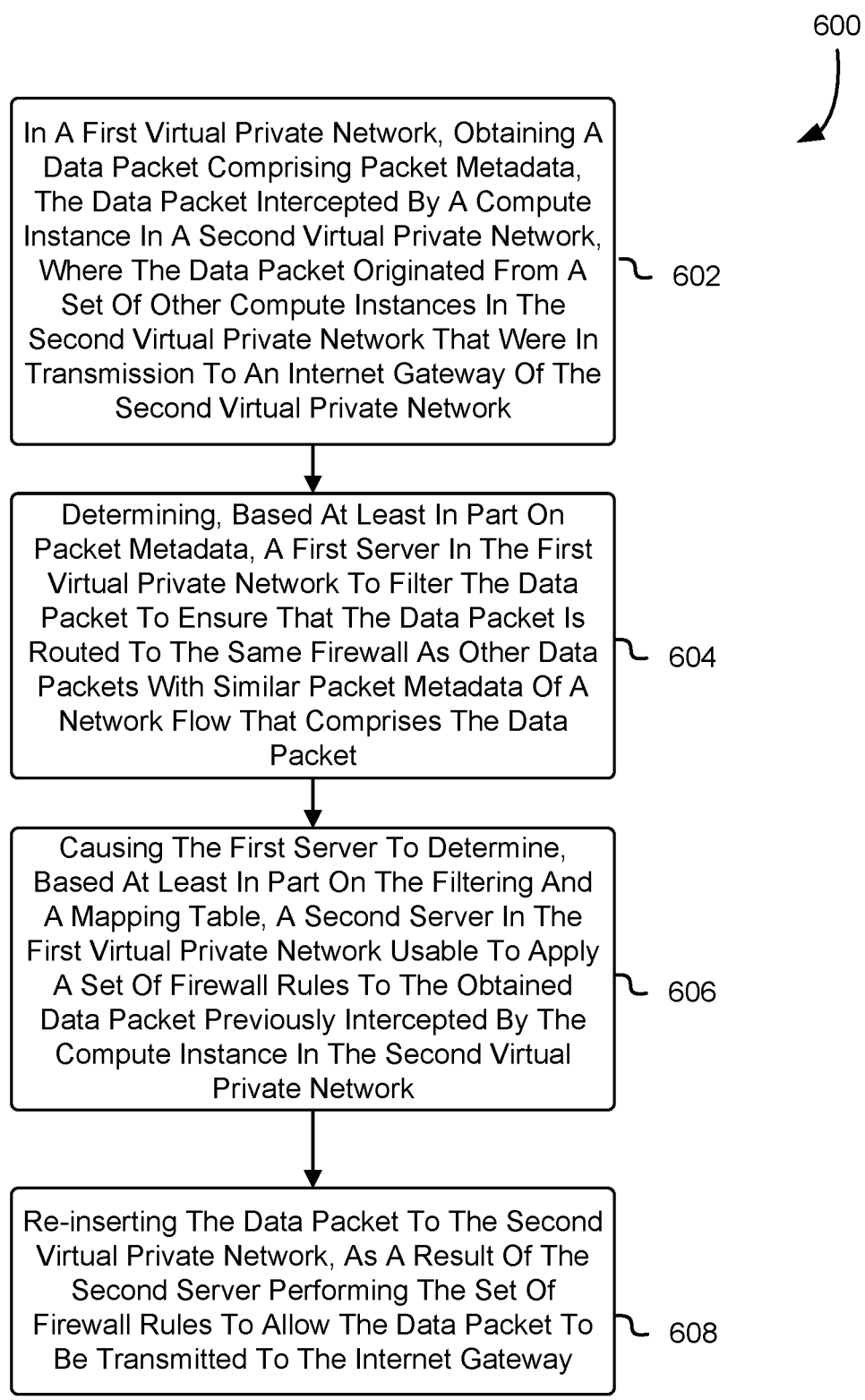
FIG. 6 illustrates a process which may be used to intercept data packets flowing in and out of a customer's virtual private network and further forwarding the data packets to a service virtual private network to apply firewall rules in accordance with an embodiment.

FIG. 6 illustrates a process 600 which may be used to intercept data packets flowing in and out of a customer's VPN and further forwarding the data packets to a service VPN to apply firewall rules in accordance with an embodiment. In an embodiment, process 600 indicates an inline security solution that is capable of analyzing stateless and stateful traffic flows. In an embodiment, process 600 allows for traffic to be analyzed and then put back on the network without having to terminate or halt connections. The process 600 may be performed by a service VPN comprising multiple computing instances. The service VPN may be associated with a customer's VPN where the service VPN intercepts network flow in and out of the customer's VPN so that applicable firewall rules are applied to the network flow. In an embodiment, the service VPN generates logs, alerts, and, if the customer specifies it in configurable firewall rules, and takes actions such as drop/reject/rate-limit on traffic based on various characteristics defined in the rules. For stateful flows, like TCP, all ingress and egress data packets that are part of the same flow should be processed by the same firewall server. In an embodiment, one or more data packets that were in transmission to an internet gateway (e.g., router) are intercepted from the customer's VPN (e.g., a first VPN) by a compute instance (e.g., service endpoint) and further provided to the service VPN (e.g., a second VPN separate from the customer's VPN) that processes the data packets 602 with applicable firewall rules. In an embodiment, the intercepted data packet contains packet metadata (e.g., source and destination IP addresses) which is used to determine a first server in the service VPN that ensures that data packets with the same information (e.g., same or similar packet metadata) are routed to the same firewall servers 604. In an embodiment, the first server determines a second server (e.g., firewall server) in the service VPN to send the intercepted data packet to. The first server uses a mapping table (e.g., forwarding table) to determine the location of the second server to send the data packet to 606. The location of the second server is determined by the first server performing a hash algorithm (e.g., Rendezvous algorithm) on the data packet. The results of the hash algorithm, generates hash values that indicate a destination address for a second (firewall) server. The results are then added to the mapping table and then referenced by the first server to forward the data packet to the second (firewall) server. The firewall server receives the data packet and applies a set of firewall rules such as rate limiting, dropping, and/or rejecting data packets. These firewall rules associated with each of the firewall servers may be predetermined and configured by the customer. After the firewall rules are applied to the data packet, the data packet is prodded back (e.g., re-inserted) into the network flow and transmitted onto the internet gateway 608. In other embodiments, the data packet may be flowing from the internet gateway to the customer and intercepted to apply the firewall rules.

In an embodiment, some of the API requests and code (in pseudo-code) that may be used to generate the customer's VPN, the service VPN, and applicable firewall rules are as follows:

Create-Firewall API Request

```
{
    "FirewallName": "string",
    "FirewallPolicy": "string",
    "VPN_ID": "string",
    "SubnetIds": ["string", . . . ],
```

```
"DeleteProtection": boolean,
"Description": "string",
"CapacityConfiguration": [{
    "Available_Zone": "string",
    "ProvislonedCapacity": number
}],
"LoggingConfiguration": {
    "LogDestinationConfigs": {
        "Object_Storage_Service_Config" : {
"OBJECT_STORAGE_SERVICE_Uri": "string" },
        "Monitoring_Service_LogsConfig": {
            "Monitoring_Service_LogRoleResourceName": "string",
            "Monitoring_Service_Group": "string"
        }
    },
    "RedactedFields": [
        {
            "Data": "string",
            "Type": "string"
        }
    ]
}
"Tags": [{
    "Key": "string",
    "Value": "string"
}]
}
```

Parameters
FirewallName: Immutable string representing the name of the new firewall
FirewallPolicy: The firewall policy object that will be used by the new firewall. The extended RESOURCENAME should be used for cross account policies
VpnId: The ID of the VPN that will contain the firewall
SubnetIds: A collection of subnet IDs to associate the firewall to. Each subnet must belong to a different Available_Zone within the firewall's region
DeleteProtection: A boolean flag indicating if the resource is deletable
Description: A customer provided description of the firewall
CapacityConfiguration: The minimum amount of compute capacity that will be provisioned for the firewall.
LoggingConfiguration: A collection of log destination objects that define where the firewall logs will be stored in.
Response

```
{
    "Firewall: { ... },
    "FirewallStatus": {
        "Status": "READY|UPDATING|DELETING|FAILED",
        "SyncState": {
            " Available_Zone ": {
            " Available_Zone 1": {
                "Attachment": {
                    "SubnetId": "string",
                    "NetworkInterfaceId" : "string",
                    "Status": "CREATING | UPDATING | DELETING | READY | FAILED",
                    "StatusReason": "string"
                },
                "Config": {
                    "shared-object-name": "PENDING | IN_SYNC",
                    "shared-object-name": "PENDING | IN_SYNC",
                    "shared-object-name": "PENDING | IN_SYNC",
                    ...
                }
            }
        }
    }
}
```

```
        }
    }
}
"Tags": [{
    "Key": "string",
    "Value": "string"
}]
}
```

Possible Exceptions
InvalidRequestException: Thrown when the request is invalid.
InternalServerError: Thrown when the request fails due to an internal service problem.
LimitExceededException: Thrown when the request would cause the customer to exceed their account limits.
ThrottlingException: Thrown when the customer request causes them to exceed the max request rate.

As an example embodiment: internal workflow may comprise the steps of:
1. Validate input
2. Generate internal ID for the firewall
3. Retrieve the payer token from the customer's object
4. Call operation to create tags for the new firewall. If this fails, the entire call should fail.
5. Identify the proper control cell for the resource
6. Call the internal create-firewall operation
7. Convert the internal create-firewall response to an external create-firewall response and return it to the customer. If an exception occurs during the creation process, an exception will be thrown.

Update-Firewall API Request

```
{
    "ResourceNameFirewallResourceName": "string",
    "SubnetsToAdd": ["string"],
    "SubnetsToRemove": ["string"],
    "FirewallPolicy": "string",
    "Description": "string",
    "LoggingConfiguration": {
        "LogDestinationConfigs": {
            "OBJECT_STORAGE_SERVICE_Config" : {
"OBJECT_STORAGE_SERVICE_Uri": "string" },
            "Monitoring Service LogsConfig": {
                "Monitoring_Service_LogRoleResourceName": "string",
                "Monitoring_Service_Group": "string"
            }
        },
        "RedactedFields": [
            {
                "Data: "string",
                "Type": "string"
            }
        ]
    },
    "RemoveLoggingConfiguration": boolean,
    "UpdateToken": "string"
}
```

Parameters
FirewallResourceName
SubnetsToAdd: A list of subnet ids to add
SubnetsToRemove: A list of subnet ids to remove Firewall-Policy: The RESOURCENAME of the firewall policy that will replace existing firewall policy
Description: A firewall description that will replace the existing description
UpdateToken: A string token used when updating a firewall. The token can be acquired by calling the describe-firewall operation Response
{
   "Firewall": { ... },
   "FirewallStatus": { ... }
   "UpdateToken": "string"
}
Possible Exceptions
InvalidRequestException: Thrown when the request is invalid.
InternalServerError: Thrown when the request fails due to an internal service problem.
InvalidTokenException: Thrown when an invalid token is passed to the request.
ResourceNotFoundException: Thrown when the request references a resource that does not exist in the caller's account.
ThrottlingException: Thrown when the customer request causes them to exceed the max request rate
   As an example embodiment: internal workflow may comprise the steps of:
     1. Validate input
     2. Identify the proper control cell for the resource
     3. Call the internal update-firewall operation
     4. Convert the internal update-firewall (create-firewall if VPN changes) response to an external response and return it to the customer Describe-Firewall API Request
{
   "FirewallName": "string",
   "ResourceNameFirewallResourceName": "string"
}
Parameters
FirewallName
FirewallResourceName
Response
{
   "Firewall": {
   },
   "FirewallStatus": { ... },
   "UpdateToken": "string" }
Possible Exceptions
InvalidRequestException: Thrown when the request is invalid.
InternalServerError: Thrown when the request fails due to an internal service problem.
ResourceNotFoundException: Thrown when the request references a resource that does not exist in the caller's account.
ThrottlingException: Thrown when the customer request causes them to exceed the max request rate
   As an example embodiment: internal workflow may comprise the steps of:
     1. Validate input
     2. Identify the proper control cell for the resource
     3. Call the internal describe-firewall operation
     4. Convert the internal describe-firewall response to an external describe-firewall response and return it to the customer List-Firewalls API Request
{
"VpnIds": ["string", ... ]
"MaxResults": integer,
"NextToken": "string"
}
Parameters
VpnIds: A collection of VPN IDs belonging to the VPNs whose firewalls will be listed. If not specified, all of an account's VPNs will have their firewalls listed (optional)
MaxResults: An integer between 1 and 100 (optional)
NextToken: (optional)
Response
{
   "Firewalls": [{
     "FirewallName": "string",
     "ResourceNameFirewallResourceName": "string",}],
   "NextToken": "string"
}
Possible Exceptions
InvalidRequestException: Thrown when the request is invalid.
InternalServerError: Thrown when the request fails due to an internal service problem.
InvalidTokenException: Thrown when an invalid token is passed to the request.
ResourceNotFoundException: Thrown when the request references a resource that does not exist in the caller's account.
ThrottlingException: Thrown when the customer request causes them to exceed the max request rate
   As an example embodiment: internal workflow may comprise the steps of:
     1. Validate input
     2. Identify the proper control cell for the resource
     3. Call the internal list-firewalls operation
     4. Convert the internal list-firewalls response to an external list-firewalls response and return it to the customer Delete-Firewall API Request
{
   "FirewallName": "string",
   "FirewallResourceName": "string"
}
Parameters
FirewallName
FirewallResourceName
Response
{
   "Firewall": { ... },
   "FirewallStatus": { ... }
}
Possible Exceptions
InvalidRequestException: Thrown when the request is invalid.
InternalServerError: Thrown when the request fails due to an internal service problem.
ResourceNotFoundException: Thrown when the request references a resource that does not exist in the caller's account.
ThrottlingException: Thrown when the customer request causes them to exceed the max request rate
   As an example embodiment: internal workflow may comprise the steps of:
     1. Validate input
     2. Identify the proper control cell for the resource
     3. Call operation to prepare resource for termination. If this fails, the entire call should fail.
     4. Call the internal delete-firewall operation
     5. Convert the internal delete-firewall response to an external delete-firewall response and return it to the customer Create-Firewall Policy API Request

```
{
    "FirewallPolicyName": "string"
    "FirewallPolicy": {
        "StatelessRuleGroupReferences": [{
            "ResourceResourceName": "string",
            "Priority": integer
```

```
        }],
        "StatelessDefaultActions": ["string"],
        "StatlessCustomActions": [{
            "ActionName": "string",
            "CustomAction": {[
                "Name": "string",
                "Value": "string"
            ]}
        }],
        "StatefulRuleGroupReferences": ["string"]
    },
    "Description": "string",
    "Tags": [{
        "Key": "string",
        "Value": "string"
    }]
}
```

Parameters

FirewallPolicyName: Immutable string representing the name of the new firewall policy FirewallPolicy: A firewall policy specifying what rules and actions should be taken by the firewall. A stateless default action must be provided in the policy object.

Description: A description for the firewall policy.

Tags: A set of key-value pairs used to append metadata to the firewall policy.

Response

```
{
    "FirewallPolicyResponse": {
        "FirewallPolicyName": "string",
        "FirewallPolicyResourceName": "string",
        "Description": "string",
        "FirewallPolicyStatus": ACTIVE|DELETING",
        "Tags": [{
            "Key": "string",
            "Value": "string"
        }]
    },
    "UpdateToken": "string"
}
```

Possible Exceptions

InvalidRequestException: Thrown when the request is invalid.

InternalServerError: Thrown when the request fails due to an internal service problem.

LimitExceededException: Thrown when the request would cause the customer to exceed their account limits.

ThrottlingException: Thrown when the customer request causes them to exceed the max request rate.

As an example embodiment: internal workflow may comprise the steps of:
1. Validate input.
2. Generate internal ID for the new firewall policy
3. Call to create tags for the new firewall policy. If this fails, the entire call should fail.
4. Identify the proper control cell for the resource
5. Call the internal create-shared-object operation
6. Convert the internal create-shared-object operation response to an external create-firewall-policy response and return it to the customer Update-Firewall-Policy API Request

```
{
    "FirewallPolicyName": "string",
```

```
    "FirewallPolicyResourceName": "string",
    "FirewallPolicy": {
        "StatelessRuleGroupReferences": [{
            "ResourceResourceName": "string",
            "Priority": integer
        }],
        "StatelessDefaultActions": ["string"],
        "StatlessCustomActions": [{
            "ActionName": "string",
            "CustomAction": {[
                "Name": "string",
                "Value": "string"
            ]}
        }],
        "StatefulRuleGroupReferences": ["string"]
    },
    "Description": "string",
    "UpdateToken": "string"
}
```

Parameters

FirewallPolicyName:

FirewallPolicyResourceName: Users must use the extended firewall policy RESOURCENAME for cross account operations FirewallPolicy: A firewall policy specifying what rules and actions should be taken by the firewall. A stateless default action must be provided in the policy object.

Description: A description for the firewall policy.

UpdateToken

Response

```
{
    "FirewallPolicyResponse": {
        "FirewallPolicyName": "string",
        "FirewallPolicyResourceName": "string",
        "Description": "string",
        "FirewallPolicyStatus": ACTIVE|DELETING",
        "Tags": [{
            "Key": "string",
            "Value": "string"
        }]
    },
    "UpdateToken": "string"
}
```

Possible Exceptions

InvalidRequestException: Thrown when the request is invalid.

InternalServerError: Thrown when the request fails due to an internal service problem.

ResourceNotFoundException: Thrown when the request references a resource that does not exist in the caller's account.

ThrottlingException: Thrown when the customer request causes them to exceed the max request rate As an example embodiment: internal workflow may comprise the steps of:
1. Validate input
2. Identify the proper control cell for the resource
3. Call the internal update-shared-object operation
4. Convert the internal update-shared-object response to an external update-firewall-policy response and return it to the customer Describe-Firewall-Policy API Request
```
{
    "PolicyName": "string",
    "PolicyResourceName": "string"
}
```
Parameters
PolicyName
PolicyResourceName
Response

```
{
    "FirewallPolicyResponse": {
        "FirewallPolicyName": "string",
        "FirewallPolicyResourceName": "string",
        "Description": "string",
        "FirewallPolicyStatus": ACTIVE|DELETING",
        "Tags": [{
            "Key": "string",
            "Value": "string"
        }]
    },
    "FirewallPolicy": { ... },
    "UpdateToken": "string"
}
```

Possible Exceptions
InvalidRequestException: Thrown when the request is invalid.
InternalServerError: Thrown when the request fails due to an internal service problem.
ResourceNotFoundException: Thrown when the request references a resource that does not exist in the caller's account.
ThrottlingException: Thrown when the customer request causes them to exceed the max request rate
 As an example embodiment: internal workflow may comprise the steps of:
  1. Validate input
  2. Identify the proper control cell for the resource
  3. Call the internal describe-shared-object operation
  4. Convert the internal describe-shared-object response to an external describe-firewall-policy response and return it to the customer List-Firewall-Policies API Request
```
{
    "MaxResults": integer,
    "NextToken": "string"
}
```
Parameters
MaxResults: An integer between 1 and 100
NextToken
Response

```
{
    "FirewallPolicies": [
        {
            "StatelessRuleGroupReferences": [{
                "ResourceResourceName": "string",
                "Priority": integer
            }],
            "StatelessDefaultActions": ["string"],
            "StatelessCustomActions": [{
                "ActionName": "string",
                "CustomAction": {[
                    "Name": "string",
                    "Value": "string"
                ]}
            }],
            "StatefulRuleGroupReferences": ["string"]
        }
    ],
    "NextToken": "string"
}
```

Possible Exceptions
InvalidRequestException: Thrown when the request is invalid.
InternalServerError: Thrown when the request fails due to an internal service problem.
ThrottlingException: Thrown when the customer request causes them to exceed the max request rate
 As an example embodiment: internal workflow may comprise the steps of:
  1. Validate input
  2. Identify the proper control cell for the resource
  3. Call the internal list-shared-objects operation with a type of firewall policy
  4. Convert the internal list-shared-resource response to an external list-firewall-policies response and return it to the customer Delete-Firewall-Policy Request
```
{
    "FirewallPolicyName": "string",
    "FirewallPolicyResourceName": "string"
}
```
Parameters
FirewallPolicyName
FirewallPolicyResourceName
Response

```
{
    "FirewallPolicyResponse": {
        "FirewallPolicyName": "string",
        "FirewallPolicyResourceName": "string",
        "Description": "string",
        "FirewallPolicyStatus": ACTIVE|DELETING",
        "Tags": {
            "Key": "string",
            "Value": "string"
        }]
    },
}
```

Possible Exceptions
InvalidRequestException: Thrown when the request is invalid.
InternalServerError: Thrown when the request fails due to an internal service problem.
ResourceNotFoundException: Thrown when the request references a resource that does not exist in the caller's account.
ThrottlingException: Thrown when the customer request causes them to exceed the max request rate
 As an example embodiment: internal workflow may comprise the steps of:
  1. Validate input
  2. Identify the proper control cell for the resource
  3. Call the internal describe-shared-object operation and acquire the resource UploadId
  4. Call a prepare resource for termination operation. If this fails, the entire call should fail.
  5. Call the internal delete-shared-object operation Create-RuleGroup API Request
```
{
    "RuleGroupName": "string",
```

-continued

```
"RuleGroup": {
    "RulesSource": {
        "RulesString": "string",
        "StatefulRules": [{
            "Action": "PASS|DROP|REJECT|ALERT",
            "Header": {
                "Protocol": "IP|TCP|UDP|ICMP|H-
TTP|FTP|TLS|SMB|
DNS|DCERPC|SSH|SMTP|IMAP|MSN",
                "Source": "string",
                "SourcePort": "string",
                "Direction": "FORWARD|ANY",
                "Destination": "string",
                "DestinationPort": "string"
            },
            "RuleOptions": [{
                "Keyword": "string",
                "Settings": "string"
            }]
        }],
        "StatelessRules": [{
            "RuleDefinition": f{
                "MatchAttributes": {
                    "Sources": [{
                        "AddressDefinition": "string"
                    }],
                    "Destinations": [{
                        "AddressDefinition": "string"
                    }],
                    "SourcePorts": [{
                        "FromPort": integer,
                        "ToPort" integer
                    }],
                    "DestinationPorts": [{
                        "FromPort": integer,
                        "ToPort" integer
                    }],
                    "Protocols": [integer],
                    "TCPFlags": [{
                        "Flags": "FIN|SYN|RST|PSH|ACK|URG|ECE|EMR",
                        "Mask": "string"
                    }]
                },
                "Actions": ["string"]
            },
            "RuleGroupRESOURCENAME": "string",
            "Priority": integer
        }]
    },
    "Description": "string",
    "Capacity": integer,
    "RuleGroupType": "STATELESS|STATEFUL"
    "Tags": [{
        "Key": "string",
        "Value": "string"
    }]
}
```

Parameters

RuleGroupName: Immutable string representing the name of the new rulegroup

RuleGroup: A RuleGroup object containing rules to apply to a firewall. Customers can specify their stateless/statefulrules within a rulesource object.

RuleGroupType: The type of the rules or rules data that is provided

Capacity: An integer between 1 and 10000 that represents a rulegroup's capacity

Description: A customer provided description of the rulegroup

Tags: A set of key-value pairs used to append metadata to the rulegroup

Response

```
{
    "RuleGroupResponse": {
        "RuleGroupResourceName": "string",
        "RuleGroupName": "string",
        "Description": "string",
        "Type": "STATELESS|STATEFUL",
        "Capacity": integer,
        "RuleGroupStatus": ACTIVE|DELETED",
        "Tags": [{
            "Key": "string",
            "Value": "string"
        }]
    }
}
```

Possible Exceptions

InvalidRequestException: Thrown when the request is invalid.

InternalServerError: Thrown when the request fails due to an internal service problem.

LimitExceededException: Thrown when the request would cause the customer to exceed their account limits.

ThrottlingException: Thrown when the customer request causes them to exceed the max request rate.

As an example embodiment: internal workflow may comprise the steps of:
1. Validate input
2. Generate internal ID for the new rulegroup
3. Call operation to create tags for the new rulegroup. If this fails, the entire call should fail.
4. Identify the proper control cell for the resource
5. Call the internal create-shared-object operation
6. Convert the internal create-shared-object operation response to an external create-rulegroup response and return it to the customer Update-RuleGroup API Request

```
{
    "RuleGroupResourceName": "string",
    "RuleGroupName": "string",
    "RuleGroup": {
        "RulesSource": {
            "RulesString": "string",
            "StatefulRules": [{
                "Action": "PASS|DROP|REJECT|ALERT",
                "Header: {
                    "Protocol": "IP|TCP|UDP|ICMP|HTTP|FTP|TLS|SMB|
DNS|DCERPC|SSH|SMTP|IMAP|MSN",
                    "Source": "string",
                    "SourcePort": "string",
                    "Direction": "FORWARD|ANY",
                    "Destination": "string",
                    "DestinationPort": "string"
                },
                "RuleOptions": [{
                    "Keyword": "string",
                    "Settings": "string"
                }
            }],
            "StatelessRules": [{
                "RuleDefinition": {
                    "MatchAttributes": {
                        "Sources": [{
                            "AddressDefinition": "string"
                        }],
                        "Destinations": [{
                            "AddressDefinition": "string"
                        }],
```

-continued

```
        "SourcePorts": [{
          "FromPort": integer,
          "ToPort" integer
        }],
        "DestinationPorts": [{
          "FromPort": integer,
          "ToPort" integer
        }],
        "Protocols": [integer],
        "TCPFlags": [{
          "Flags": "FIN|SYN|RST|PSHACK|URG|ECE|EMR",
          "Mask": "string"
        }]
      },
      "Actions": ["string"]
    },
    "RuleGroupRESOURCENAME": "string",
    "Priority": integer
  }],
  }
 },
 "Type": "STATELESS|STATEFUL",
 "Description": "string",
 "UpdateToken": "string"
}
```

Parameters
RuleGroupName
RuleGroupResourceName
RulesGroup
Type: The type of rulegroup (stateless or stateful)
UpdateToken
Response

```
{
  "RuleGroupResponse": {
    "RuleGroupResourceName": "string",
    "RuleGroupName": "string",
    "Description": "string",
    "Type": "STATELESS|STATEFUL",
    "Capacity": integer,
    "RuleGroupStatus": ACTIVE|DELETED",
    "Tags": [{
      "Key": "string",
      "Value": "string"
    }]
  },
  "UpdateToken": "string"
}
```

Possible Exceptions
InvalidRequestException: Thrown when the request is invalid.
InternalServerError: Thrown when the request fails due to an internal service problem.
ResourceNotFoundException: Thrown when the request references a resource that does not exist in the caller's account.
ThrottlingException: Thrown when the customer request causes them to exceed the max request rate As an example embodiment: internal workflow may comprise the steps of:
1. Validate input
2. Identify the proper control cell for the resource
3. Call the internal update-shared-object operation
4. Convert the internal update-shared-object response to an external update-rulegroup response and return it to the customer Describe-RULEGROUP API Request
```
{
  "RuleGroupName": "string",
  "RuleGroupResourceName": "string",
  "Type": "STATELESS|STATEFUL"
}
```
Parameters
RuleGroupName
RuleGroupResourceName Type: The type of rulegroup (stateless or stateful)
Response
```
{
  "RuleGroup": { },
  "RuleGroupResponse": { },
  "UpdateToken": "string"
}
```
Possible Exceptions
InvalidRequestException: Thrown when the request is invalid.
InternalServerError: Thrown when the request fails due to an internal service problem.
ResourceNotFoundException: Thrown when the request references a resource that does not exist in the caller's account.
ThrottlingException: Thrown when the customer request causes them to exceed the max request rate As an example embodiment: internal workflow may comprise the steps of:
1. Validate input
2. Identify the proper control cell for the resource
3. Call the internal describe-shared-object operation
4. Convert the internal describe-shared-object response to an external describe-rulegroup response and return it to the customer List-RULEGROUPS API Request
```
{
  "MaxResults": integer,
  "NextToken": "string"
}
```
Parameters
MaxResults
NextToken
Response
```
{
  "RuleGroups": [{
    "RuleGroupName": "string",
    "RuleGroupResourceName": "string"
  }]
}
```
Possible Exceptions
InvalidRequestException: Thrown when the request is invalid.
InternalServerError: Thrown when the request fails due to an internal service problem.
ThrottlingException: Thrown when the customer request causes them to exceed the max request rate As an example embodiment: internal workflow may comprise the steps of:
1. Validate input
2. Identify the proper control cell for the resource
3. Call the internal list-shared-objects operation with a type of rulegroup
4. Convert the internal list-shared-resource response to an external list-rulegroups response and return it to the customer DELETE-RULEGROUP API Request
{
   "RuleGroupName": "string",
   "RuleGroupResourceName": "string",
   "Type": "STATELESS|STATEFUL"
}
Parameters
RuleGroupName
RuleGroupResourceName
Type: The type of rulegroup (stateless or stateful)
Response
{
   "RuleGroup": { . . . },
   "Status": "ACTIVE|DELETING"
}

As an example embodiment: internal workflow may comprise the steps of:
1. Validate input
2. Identify the proper control cell for the resource
3. Call the internal describe-shared-object operation and acquire the resourceUploadId
4. Call the operation to prepare resource for termination. If this fails, the entire call should fail.
5. Call the internal delete-shared-object operation TAG-Resource API Request
{
   "ResourceId": "string",
   "Tags": [{"Key": "string", "Value": "string"}, . . . ]
}
Parameters
ResourceId
Tags: A set of key-value pairs containing metadata belonging to the specified resource
Response
{ }

Untag-Resource API Request
{
   "ResourceId": "string",
   "TagKeys": ["string", . . . ]
}
Parameters
ResourceId
TagKeys: A set of key strings used to identify what tags to delete
Response
{ }

List-tags-for-Resource API Request
{
   "ResourceId": "string"
}
Parameters
ResourceId
Response
{
   "Tags": [{"Key": "string", "Value": "string"}, . . . ]
}

FAS Validations

| | A | B | C |
|---|---|---|---|
| 1 | Operations | Parameter | Validation |
| 2 | create-firewall, update-firewall | SubnetIds | Call describe-subnets of a web service operation in order to verify ownership of the passed SubnetIds |
| 3 | create-firewall, update-firewall | VpnId | Call describe-VPNs a web service operation in order to verify ownership of the passed VpnId |
| 4 | create-firewall, update-firewall | LogDestinations | Call list-buckets in an object storage service operation to verify the customer's ownership and permissions on the passed object storage service bucket |

CREATE-IPSET API Request

```
{
    "IPSet": {
        "IPSetName": "string",
        "Description": "string",
        "IPSetData": {
            "IPSetString": "string"
        },
        "Capacity": integer
    },
    "Tags": [{
        "Key": "string",
        "Value": "string"
    }]
}
```

Parameters
IPSetName: Immutable string representing the name of the new IPSet
Description: A customer provided description of the IPSet
IPSetData: A reference to the IPSet's data. Customers can provide IPSets via a JSON string.
Private preview customers will only be able to pass IPSets as strings
Capacity: An immutable limit on the IPSet size used to determine costs internally.
Tags: A set of key-value pairs used to append metadata to your IPSet.
Response

```
{
    "IPSet": {
        . . .,
        "IPSetResourceName": "string",
    },
    "Status": ACTIVE|DELETING",
    "Tags": {
        "Key": "string",
        "Value": "string"
    }]
}
```

As an example embodiment: internal workflow may comprise the steps of:
1. Validate input
2. Generate internal ID for the new IPSet
3. Call the operation to create tags for the new IPSet. If this fails, the entire call should fail.
4. Identify the proper control cell for the resource
5. Call the internal create-shared-object operation
6. Convert the internal create-shared-object operation response to an external create-ipset response and return it to the customer Update-IPSet API Request
{
  "IPSet": {
    ...,
    "IPSetResourceName": "string",
    "UpdateToken": "string"
  }
}
Parameters
IPSetName
IPSetResourceName
IPSetData
UpdateToken
Response
{
  "IPSet": { ... },
  "Status": "ACTIVE DELETING"
}

As an example embodiment: internal workflow may comprise the steps of:
1. Validate input
2. Identify the proper control cell for the resource
3. Call the internal update-shared-object operation
4. Convert the internal update-shared-object response to an external update-ipset response and return it to the customer DESCRIBE-IPSet API Request
{
  "IPSetName": "string",
  "IPSetResourceName": "string",
}
Parameters
IPSetName
IPSetResourceName
Response
{
  "IPSet": { ... },
  "Status": "ACTIVE|DELETING"
}

As an example embodiment: internal workflow may comprise the steps of:
1. Validate input
2. Identify the proper control cell for the resource
3. Call the internal describe-shared-object operation
4. Convert the internal describe-shared-object response to an external describe-ipset response and return it to the customer List-IPSETS API Request
{
  "MaxResults": integer,
  "NextToken": "string"
}
Parameters
MaxResults: An integer between 1 and 100
NextToken
Response
{
  "IPSets": [{
    "IPSetName": "string",
    "IPSetResourceName": "string",
    "Description": "string"
  }]
}

As an example embodiment: internal workflow may comprise the steps of:
1. Validate input
2. Identify the proper control cell for the resource
3. Call the internal list-shared-objects operation with a type of IPSet
4. Convert the internal list-shared-resource response to an external list-ipsets response and return it to the customer DELETE-IPSET API Request
{
  "IPSetName": "string",
  "IPSetResourceName": "string",
}
Parameters
IPSetName
IPSetResourceName
Response
{
  "IPSet": { ... },
  "Status": DELETING
}

Figure 7:
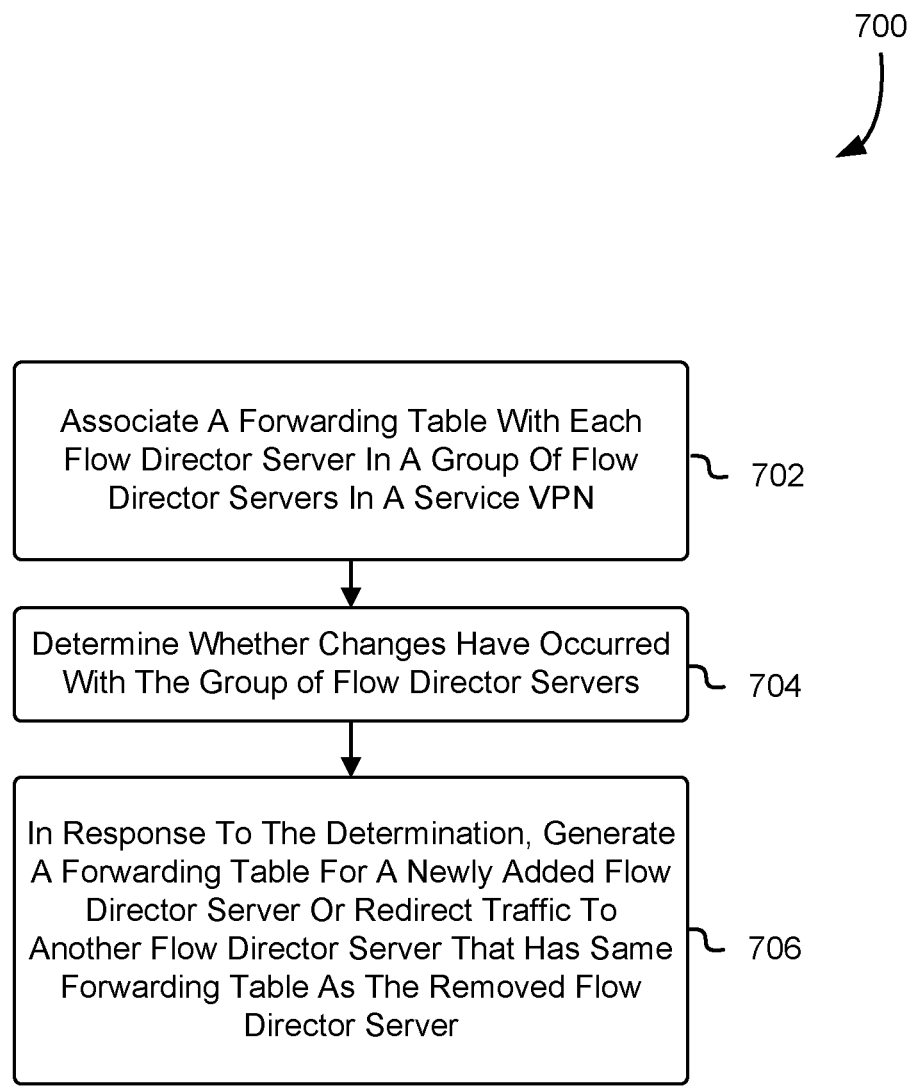
FIG. 7 shows a process which is used to update a forwarding table when changes are detected at a set of servers in a service virtual private network in accordance with an embodiment.

As an example embodiment: internal workflow may comprise the steps of:
1. Validate input
2. Identify the proper control cell for the resource
3. Call the internal describe-shared-object operation and acquire the resourceUploadId
4. Call the operation. If this fails, the entire call should fail.
5. Call the internal delete-shared-object operation FIG. 7 shows a process 700 which is used to update a forwarding table when changes are detected in a set of flow director servers in a service VPN in accordance with an one embodiment. In an embodiment, a service VPN may include a group servers that are configured to direct flow of network traffic. The process 700 may be performed by the servers in the service VPN where one layer of theses servers may be referred to as flow director servers and individually may apply a hash algorithm to a received data packet to determine which firewall server from another layer of the servers to forward the data packet to. Each of these flow director servers may have a forwarding table associated with them 702. The service VPN may utilize packet metadata to determine that changes have occurred with at least one of the flow director servers 704. A health-check process may be applied to the flow director servers to determine whether any changes have occurred. If a change has occurred, such as a new flow director server being added to the group of flow director servers, a new forwarding table may be locally calculated, stored in memory, and then an indicator may be provided to indicate that the flow director server is ready to forward data packets. While, the new flow director server is being added, an association weight with the new flow director may be set to 0 so that traffic does not flow to while it's in the adding state. If a change has occurred, such as a flow director server being removed from the group of flow director servers, network traffic may land on a different flow director server that has the same forwarding table (which would pick the same firewall servers to forward the flows to) as the flow director server that was removed 706.

Figure 8:
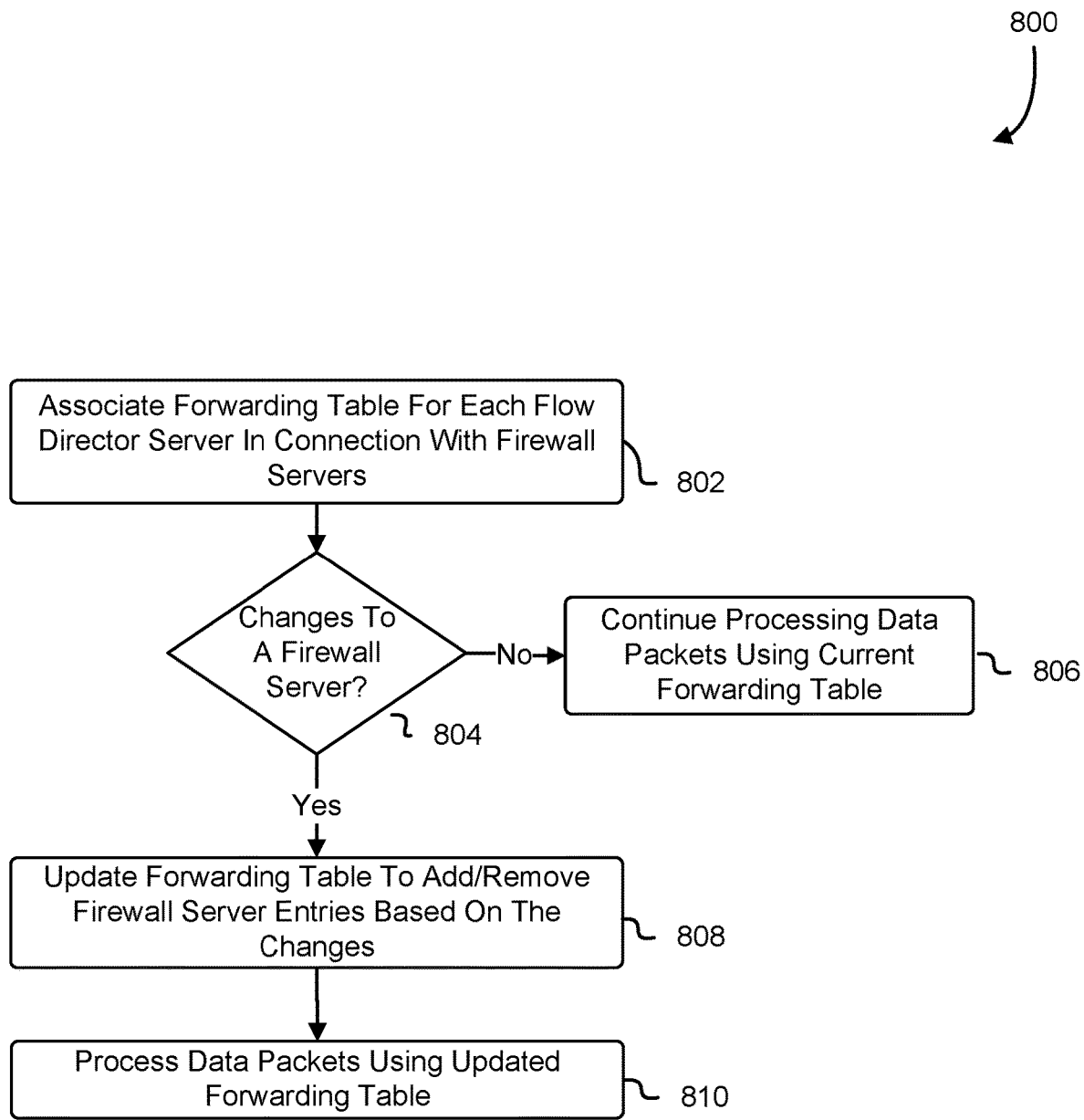
FIG. 8 shows a process which is used to update a forwarding table when changes are detected at the firewall servers in a service virtual private network in accordance with an embodiment.

FIG. 8 shows a process 800 which is used to update a forwarding table when changes are detected at the firewall servers in a service VPN in accordance with an embodiment. In an embodiment, the process 800 is performed by a service VPN which may include a plurality of servers with at least some of the servers configured to direct the flow of traffic (flow director servers) and some of the servers configured to apply firewall rules. In an embodiment, a flow director server may obtain an intercepted data packet that was flowing through a customer's VPN. The flow director server may be associated with a forwarding table 802 that includes information of which firewall server to send data packets to. A determination 804 at the flow director server may be made as to wither there have been any changes to the firewall servers that the flow director server is connected to. If no changes are detected, the data packets are then forwarded to the proper firewall servers using the current forwarding table 806. Changes to the firewall server may include adding/removing a firewall server to the group of firewall servers that are associated with the flow director server. If a change has been detected, the forwarding table may then be updated to reflect these changes 806. As an example, when a firewall server is removed due to a planned event, the impacted rows of the forwarding tables are updated to swap the primary and secondary entries and the state is set to draining for a predetermined amount of time. While in the draining state the secondary (old primary) address is included in the encapsulated data. After another predetermined amount of time, the server may then be removed from the list and the forwarding table is reshuffled to fill in the empty secondary entries. As such, data packets that flow through the flow director server may now be forwarded to a firewall server using the updated forwarding table 810. To determine whether a firewall server has been removed, the flow directed server may use a service to perform a health-check on all of the firewall servers that are in connection with the flow director server. The results of the health-check on the firewall servers may provide an indication whether there has been changes (e.g., added/removed/failed) that have occurred with the firewall servers.

Figure 9:
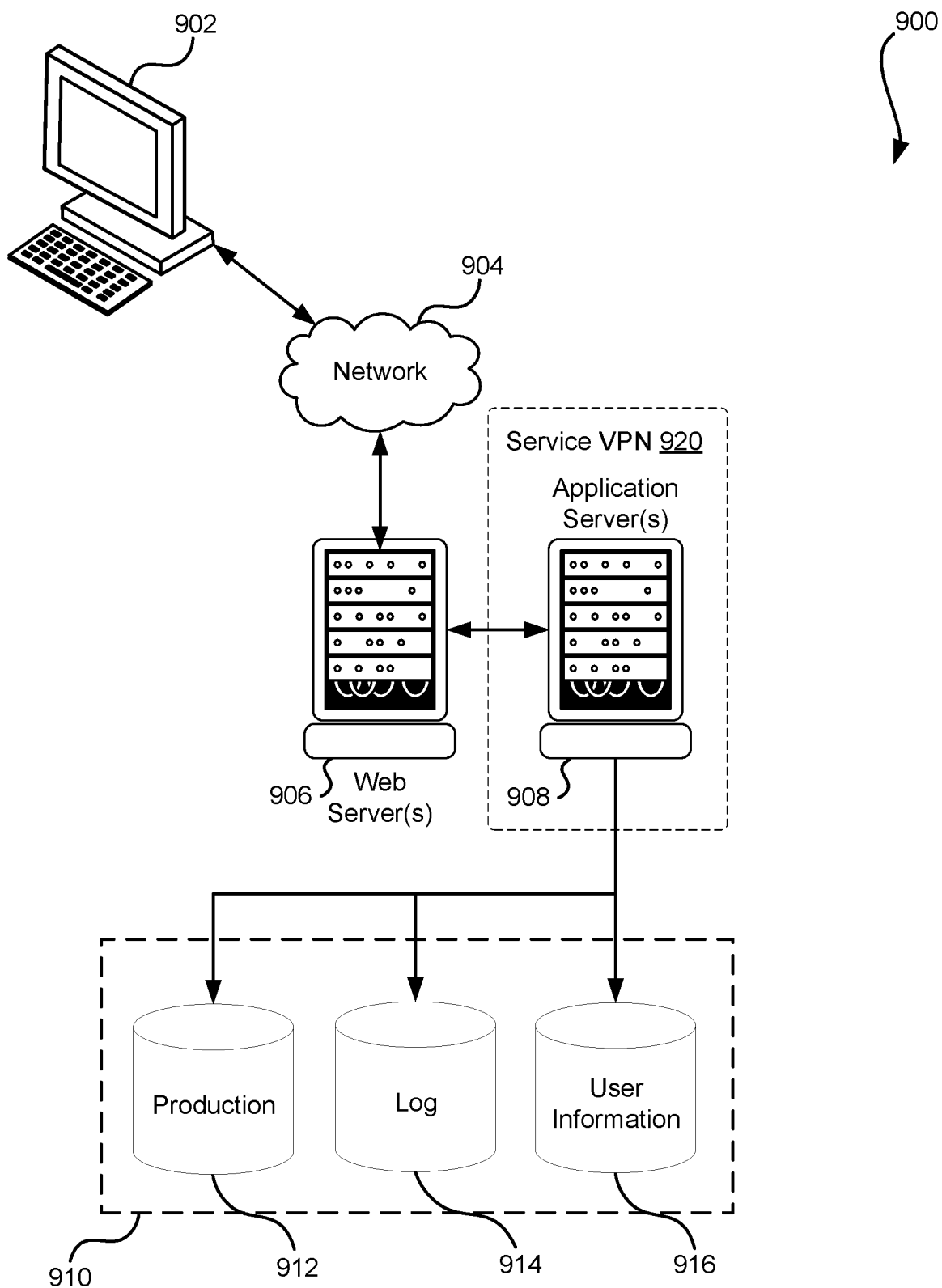
FIG. 9 illustrates an environment in which various embodiments can be implemented.

FIG. 9 illustrates aspects of a system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art. In an embodiment, network traffic information flowing into and out of client device 902 over network 904 may be intercepted by web server (which may, in some instances, be a service endpoint) 906 associated with the client device 902. The service endpoint 906 may intercept a data packet that is either flowing from the client device 902 or vice versa. The intercepted data packet may be provided to a service VPN 920. The service VPN 920 may include one or more servers and/or computing instances that are configured to both filter and apply firewall rules to the intercepted data packet. In an embodiment, service VPN 920 includes a layer of application servers 908 (which may be computing instances) that receive the data packet and apply a hash algorithm to it such that a destination address for the data packet is determined. By applying the hash algorithm to the data packet at the layer of application servers 908, a consistent mapping can be achieved. In other words, using the layer of application servers 908 to direct network traffic flow would allow for the same network flow to be forwarded to the same firewall instance. Once the destination address has been determined, it may be added to a mapping table for at least one of the application servers in the layer of application servers 908. Subsequently, the mapping table may be used to determine a firewall server from a second layer of the application servers 908 for the data packet to forward to apply firewall rules. The data packet may then be re-inserted back into the network flow over network 904 without terminating the connection.

In an embodiment, the illustrative system includes at least one application server 908 and a data store 910, and it should be understood that there can be several application servers, layers, or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update, or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a VPN, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#, or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers, or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing," are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising: in a first virtual private network, obtaining a data packet comprising packet metadata, the data packet intercepted by a compute instance in a second virtual private network, where the data packet originated from a set of other compute instances in the second virtual private network that were in transmission to an Internet gateway of the second virtual private network; determining, based at least in part on packet metadata, a first server in the first virtual private network to filter the data packet to ensure that the data packet is routed to the same firewall as other data packets with similar packet metadata of a network flow that comprises the data packet; causing the first server to determine, based at least in part on the filtering and a mapping table, a second server in the first virtual private network usable to apply a set of firewall rules to the obtained data packet previously intercepted by the compute instance in the second virtual private network; and re-inserting the data packet to the second virtual private network, as a result of the second server performing the set of firewall rules to allow the data packet to be transmitted to the Internet gateway.

2. The computer-implemented method of claim 1, wherein the first server:
    applies a Rendezvous algorithm to map the data packet and other data packets with the same network flow to the same server; and
    stores the results of the algorithm to the mapping table.

3. The computer-implemented method of claim 2, further comprising determining the second server by using the results from applying the algorithm.

4. The computer-implemented method of claim 1, wherein the data packet is re-inserted to the second virtual private network to be transmitted to the Internet gateway without flowing back through the first server.

5. A system, comprising:
one or more processors; and
memory that stores computer-executable instructions that are executable by the one or more processors to cause the system to:
  obtain, at a first virtual private network, a data packet transmitting between a set of computing systems of a computing resource service provider in a second virtual private network and a web server outside of the second virtual private network, wherein the first virtual private network hosts a plurality of servers;
  utilize, at the first virtual private network, a first subset of the plurality of servers to determine, based at least in part on information from the obtained data packet, a second subset of the plurality of servers to apply a set of firewall rules to the data packet; and
  as a result of a set of operations being performed by the set of firewall rules to the data packet, provide the data packet to the second virtual private network for continued transmission.

6. The system of claim 5, wherein the computer-executable instructions that are executable by the one or more processors, further cause the system to:
  use the first subset of the plurality of servers to filter the data packet by applying a hash algorithm to the data packet; and
  store results from applying the hash algorithm to a mapping table in connection with the first subset of the plurality of servers.

7. The system of claim 6, wherein the mapping table includes information indicating data packets that belong to the same flow will be consistently mapped to the same row of the mapping table.

8. The system of claim 5, wherein the computer-executable instructions further cause the system to:
  add a server to the first subset;
  generate a mapping table specifically for the added server; and
  provide an indication to the system that the added server is ready to forward data packets.

9. The system of claim 5, wherein the computer-executable instructions further cause the system to:
  remove a server from the first subset;
  determine, from the first subset, a second server that has the same mapping table as the removed server; and
  use the second server to forward data packets such that data packets with the same traffic flow are distributed to the same server in the second subset.

10. The system of claim 5, wherein the computer-executable instructions further cause the system to perform a health check on the first subset of the plurality of servers to determine whether a server in the second subset has experienced a failure.

11. The system of claim 10, wherein the computer-executable instructions further cause the system to:
  update the mapping table by adjusting a state of the server in the second subset that has experienced failure and replacing a destination address for the server in the second subset with a destination address for another server in the second subset previously identified as a secondary server for the data packet; and
  route the data packet to the other server in the second subset to be processed locally.

12. The system of claim 5, wherein the data packet bypasses the first subset when being provided to the second virtual private network.

13. A non-transitory computer-readable storage medium storing thereon executable instructions that, as a result of being executed by one or more processors of a computer system, cause the computer system to at least:
  intercept data during transmission along a network path between a set of computing systems and a web server;
  utilize a first compute instance to determine, based at least in part on information from the intercepted data, a second compute instance to apply a set of firewall rules to the data; and
  as a result of a set of operations being performed by the set of firewall rules to the data, re-insert the data to the network path for continued transmission.

14. The non-transitory computer-readable storage medium of claim 13, wherein the instructions further comprise instructions that, as a result of being executed by the one or more processors, cause the computer system to filter the data, at the first compute instance, by applying a hash algorithm to the data.

15. The non-transitory computer-readable storage medium of claim 14, wherein the hash algorithm, after applied to the data, results in hash values that indicate destination addresses to a set of firewall instances comprising the second compute instance.

16. The non-transitory computer-readable storage medium of claim 15, wherein the destination addresses are stored in a mapping table that includes a network address for the second compute instance, wherein the second compute instance is usable to apply the set of firewall rules to the data.

17. The non-transitory computer-readable storage medium of claim 15, wherein the instructions further comprise instructions that, as a result of being executed by the one or more processors, cause the computer system to update the mapping table based on changes to the set of firewall instances.

18. The non-transitory computer-readable storage medium of claim 17, wherein the mapping table is updated by removing a destination address from the set of firewall instances that has experienced a failure.

19. The non-transitory computer-readable storage medium of claim 13, wherein data is re-inserted to the network path without passing through the first compute instance.

20. The non-transitory computer-readable storage medium of claim 13, wherein the first compute instance is determined based on source and destination IP address in packet metadata from the intercepted data.

* * * * *